3,326,841
ELASTOMERIC COMPOSITIONS OF OIL AND
ANHYDRIDE-LINKED RESINS
Bruce W. Hotten, Orinda, Calif., assignor to Chevron Research Company, San Francisco, Calif., a corporation of Delaware
No Drawing. Filed Mar. 24, 1966, Ser. No. 536,988
7 Claims. (Cl. 260—33.6)

This application is a continuation-in-part of my copending patent applications, Ser. No. 188,268, entitled, "Strippable Coatings, filed Apr. 17, 1962, Ser. No. 454,641, entitled, "Elastomeric Compositions of Oil and Urethane-Linked Resins," filed May 10, 1965; and Ser. No. 531,018, entitled, "Maleic Anhydride- and Diene-Reaction Products," filed Mar. 2, 1966.

This invention is directed to materials which are especially useful as protective coatings for metal and wooden objects, and as bases for flexible foamed materials which are, in turn, suitable as insulators, padding for various materials, etc.

Many articles of commerce which are not perishable are stored for long periods of time after their manufacture until they are used. For example, many automotive parts such as gears, etc., are manufactured and shipped to assembly plants where they are stored prior to assembly of the machinery and to warehouses wherein parts are kept prior to their use for repair of machinery such as motor vehicles, etc. Also, wood materials such as plywood sheeting and various decorative panelling are often stored prior to use. It is thus often necessary to apply protective coating material to such objects to protect them from damage from corrosion and from physical damage which often occurs during shipment.

The first significant application of strippable coatings was the use of such coatings to protect cargoes carried on ship decks during World War II when all available space was employed for the transportation of cargo. Subsequently, many ships which were stored or "mothballed" after the war were protected by coating the numerous parts of the ship, such as the decks, guns, rails, engines, etc., to protect the metallic parts from corrosion.

Cosmoline has been extensively employed as a protective coating composition. This material is often applied to the metallic parts which are being stored, as for example, the ship parts previously enumerated. However, a disadvantage of the cosmoline has been the effort and time necessary to remove material when the storage period ends. Thus, it is necessary first to wipe off the coated parts to remove the excess cosmoline and follow it by numerous solvent washes to make sure that all of the sticky coating has been removed. Also, the protection of wood materials by cosmoline is not entirely satisfactory, as the greaselike substance often discolors them. In addition, various vinyl polymers have been used for strippable coatings. However, these materials are practically limited to uses as coatings on metal surfaces. They are not suitable for use in coating painted parts because the plasticizers and solvents employed in the coating affect painted surfaces. Further, the vinyl coating materials are expansive, making them entirely uneconomical for coating a low-cost item.

Other coatings have been prepared from the so-called "cellulosics," for example, ethyl cellulose and cellulose acetate butyrate. The cellulosics can be melted and the metal parts to be coated dipped into the melt. Although the cellulosics do form protective coatings for metal, the coating is removed only with difficulty. Also, they are not suitable for use in coating wood articles.

In addition to the materials which are applied as a solid coating to protect the surfaces of objects, it is often desirable to provide materials that exist in the form of foam, that is, materials which contain from within them a multitude of very fine gas-filled cavities or bubbles. Thus, examples of such materials which have been employed are the polyurethanes and foam rubber, etc. They are especially useful for providing backings for rugs, for various insulating purposes, for providing protective surfaces of a higher thickness and thus greater protection from physical harm than the previously discussed thin coating materials. While foam rubber is an excellent material for these purposes, it is quite expensive, and thus its use in many applications is precluded by its expense.

In copending U.S. patent application Ser. No. 188,268, of which this application is a continuation-in-part, there are disclosed coating materials which comprise oils containing polymers of olefins and olefinic alcohol esters. In copending application Ser. No. 449,878, filed Apr. 21, 1965, there are disclosed coating materials comprising oils, and polymers having attached to the backbone, in addition to ester groups, free hydroxyl groups. These materials have significantly higher tensile strength than those of the previously noted applications, and in addition are especially suitable for the production of high-strength, highly elastic foams. Copending application Ser. No. 454,641 is directed to materials of the previous type wherein the polymers containing free hydroxyl groups are cross-linked with certain polyisocyanates, yielding polymers of much greater strength.

It has now been found that low cost and highly elastic coatings and foams of significantly higher strength may be produced by cross-linking the hydroxyl-containing polymer with certain novel dianhydrides. These dianhydride-type materials are disclosed in my copending U.S. application Ser. No. 531,018, previously referred to, constitute materials obtained by reacting about 2 mols of maleic anhydride with a nonconjugated aliphatic diene of from 8 to 40 carbon atoms in which the two ethylenic groups are separated by at least 3 carbon atoms. The modification of the polymers by the reaction with these anhydride materials surprisingly produces, when incorporated in certain oils, coating or foam material of great strength, but without tendency to "bleed" or lose oil from the composition, as would be expected with the incorporation of the most highly polar groups. Thus, the coating composition of this invention consists essentially of a hydrocarbon lubricaing oil base having an aromatic ring content of from about 15 to 75 percent by weight and from 20 to 80 percent by weight of a cross-linked polymer formed by reacting in situ, (X) the maleic anhydride-diene reaction product with (Y) a polymer consisting essentially of randomly distributed monomer units characterized by the formulae:

(A) $(-CH_2-\underset{\underset{R_1}{|}}{C}H-)$ (B) $(-\underset{\underset{R_2}{|}}{C}H-CH-)$
$\phantom{(-CH-CH)}|$
$\phantom{(-CH-CH-)}OH$ and (C) 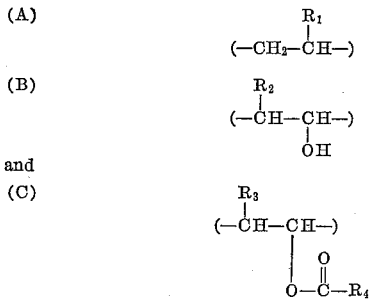

wherein $R_1$, $R_2$ and $R_3$ are hydrogen or alkyl radicals of 1 to 2 carbon atoms, $R_4$ is hydrogen or an alkyl radical of 1 to 11 carbon atoms, (A) is present in the polymer in the amount of 80 to 95 mol percent, (B) in the amount of 0.1 to 5 mole percent, and (C) in the amount of from 5 to 20 mol percent.

Thus, the polymers which are cross-linked to form the composition of this invention are derived from an olefin, an olefinic alcohol and an ester of an olefinic alcohol with a monocarboxylic acid. Suitable olefins which make up Unit (A) in the polymer include ethylene, propylene, butylene, and isobutylene. Suitable olefinic alcohols from which Unit (B) is derived include vinyl alcohol, allyl alcohol, 2-butenol, 1-butenol, etc. The unit represented by (C) is derived from an ester of the olefinic alcohols listed above and a monocarboxylic acid of from 1 to 12 carbon atoms. Thus, suitable acids include formic, acetic, propionic, butanoic, octanoic, hexanoic, lauric, etc. Unsaturated acids may also be included, such as propenoic acid, butenoic, octenoic, etc. The polymers may be prepared by any suitable method. Ordinarily, free-radical polymerization is utilized with a free-radical producing catalyst, such as oxygen or an organic peroxide, at elevated pressures and temperatures from 150 to 250° C. However, a simpler method of producing the polymers comprises reacting an olefin and the ester of an unsaturated alcohol under free-radical conditions at a pressure of from 100 to 200 atmospheres and a temperature in the order of 150 to 250° C., distilling to remove unreactive materials and hydrolyzing a portion of the ester groups. From 5 to 50 percent of the ester groups are thus hydrolyzed. The preferred polymers have molecular weights in the general range from about 100,000 up to about 1,000,000. The preferred method of hydrolyzing the ester groups mentioned above is by saponification with a strong base, such as NaOH, KOH, etc. The saponification can be accomplished by mixing the base in proper proportion with the polymer, preferably in situ, that is in the oil solution.

An example of a preferred polymer is one which is prepared by the saponification of a copolymer of ethylene and vinyl acetate. These copolymers are well known in the art and are prepared by reacting an ester of vinyl alcohol and acetic acid with ethylene at a pressure of about 15,000 to about 30,000 p.s.i.g. at a temperature in the range of above 150° C., and separating the resulting copolymer from the unreacted monomer.

As previously noted, the anhydride linking agent may be prepared by the reaction of maleic anhydride with certain dienes having from 7 to 40 carbon atoms, preferably from 8 to about 20 carbon atoms. These dienes may be either straight-chain or branched.

The maleic anhydride-diene reaction products may be prepared by mixing about 2 molar proportions of the anhydride with the diene and heating the mixture. An inert solvent may be employed to facilitate mixing of the reactants; however, the solvent is not necessary in most cases, it being sufficient just to mix and stir the reactants. It is necessary to heat the reaction mixture at temperatures in the range from about 100 to 240° C. Temperatures of around 200° C. are generally preferred. The reaction may be carried out at atmospheric pressure; but in the case of the lower molecular weight dienes, heating in a reaction bomb under pressure is advantageous.

Examples of diene reactants which may be used include 1,6-heptadiene, 1,7-octadiene, 2,6-dimethyl-2,7-octadiene, 1,11-dodecadiene, 1,9-octadecadiene, etc.

The reaction of the maleic anhydride-diene reaction product with the polymer is effected by contacting the materials in oil solution, which will result generally in production of the final coating material. Physical mixing will generally produce the necessary intimate contact to effect the reaction. However, in many cases, it may be preferable to heat the mixture in order to hasten the reaction.

As previously noted, the compositions of the invention may be used as coating materials as they are prepared or they may be converted into foam-type materials. Foams provide greater cushioning effects than the unfoamed material and are preferable for many uses. The foams may be prepared by introducing into the composition such foaming agents as azobis-isobutronitrile. This introduction is made at a temperature below the "foaming" temperature, or decomposition temperature of the agent. The composition is then heated to that temperature, whereupon bubbles evolve from the agent into the composition expanding it. The composition is then cooled to allow the bubbles to set in the foam material. Other chemical foaming agents which may be employed include azobisformamide and sym.-dichlorotetrafluoroethylene. Other techniques of foaming may be employed, for example, mechanical methods and also those techniques in which gas under high pressure is injected into the composition. However, since these foaming techniques are known in the art and thus do not constitute a part of this invention, they will not be described in further detail.

The oils which are used as bases for the compositions of this invention comprise a variety of lubricating oils, such as naphthenic base, paraffin base, mixed base oils, and oils derived from synthetic processes. The oil should have an aromatic ring content of from about 15 to 75 percent by weight. Oils which are preferred are the polyalkylbenzenes, such as polypropenylbenzene. An example of an especially preferred oil is an alkylbenzene bottom oil, which is benzene that has been alkylated with a propylene polymer and having an average side chain content of about $C_{19}$. The alkyl carbons may be in from about 1 to 3 separate side chains and the oil has a total molecular weight of about 350.

It is also preferred that the oils have an aniline point below 150° F.

The following examples characterize the compositions of this invention. The examples are intended to be only illustrative and are non-limiting.

EXAMPLE 1

*Saponification of ethylene-vinyl acetate copolymer*

6,400 grams of a copolymer of ethylene and vinyl acetate (copolymer containing 72 percent by weight ethylene units and 28 percent by weight vinyl acetate units) having a molecular weight of about 400,000 was mixed with a 9,440-gram portion of a high aromatic content $SO_2$ extract oil which has a molecular weight of 240, aniline point of 86° F., viscosity at 100° F. of 74 SSU and had the following unit concentrations: aromatic, 38%; naphthenic, 32%; paraffinic, 30%. The mixture was stirred and heated in the oil for about 1¼ hours, until the copolymer was well dispersed in the oil. The mixture was cooled to 200° F. and to it was added a 160-gram portion of NaOH in water solution. Stirring was continued and heat was added to drive off free $H_2O$, the heat reaching 265–270° F. The material was heated to about 340° and discharged into a shallow pan. The reaction yielded a flexible elastomer having the following characteristics: softening temperature, 200° F.; tensile strength (Instron) 260 p.s.i.; elongation at break, 730%. The elastomer was essentially non-oily.

EXAMPLE 2

*Reaction of maleic anhydride with 1,7-octadiene*

115.9 grams of 95% octadiene (1 mol) and 196 grams (2 mols) of maleic anhydride were mixed in a pressure bomb which was placed on a mechanical rocker. The bomb was heated to 204° C. while the bomb was rocked. The temperature was maintained at about 200° C. for a period of 2 hours. The heating was then stopped, and the bomb was allowed to cool overnight. The bomb was opened and found to contain a product of a viscous semifluid nature with about 4 ml. of a light liquid on top. The material was transferred to a beaker, heated, and blown with nitrogen to remove unreacted diene. The yield was 272 grams of a viscous material which showed by analysis that it was a dianhydride adduct of the diene. The product had a saponification number of 687 compared with 730 theoretical for the di-anhydride.

EXAMPLE 3

Reaction of maleic anhydride with diene derived from oleyl alcohol

A portion of an 18-carbon diene was prepared by dehydration of oleyl alcohol with boric acid. 100 grams of this material were placed in a resin flask equipped with a mechanical stirrer, thermometer, nitrogen inlet, condenser takeoff and a heating mantle. 39.2 grams (0.4 mol) of maleic anhydride were added to the mixture. The mixture was heated at reflux for a period of 3 hours and 45 minutes, reaching a temperature of 250° C. The mixture was then subjected to infrared analysis which indicated the disappearance of the terminal double bond and the absence of maleic anhydride. At this point the mixture was cooled to 100° C. and a second 39.2 grams (0.4 mol) portion of maleic anhydride was added. The mixture was refluxed an additional 6 hours, reaching a temperature of 236° C. It was then cooled, yielding 152 grams of a viscous brown material. Oxygen analysis gave 20.3% compared with 21.5% for the dianhydride.

EXAMPLE 4

Cross-linking of saponified polymer with dianhydride 99 grams of the saponified copolymer and oil prepared in Example 1 and 1 gram of the reaction product prepared in Example 2 were mixed together at a temperature of about 200° F. and heated for 1 hour at 240° F. The mixture was cooled, yielding an elastomer having the following characteristics: softening temperature, 400° F.; tensile strength (Instron) 400 p.s.i.; elongation at break, 680%.

Elastomers were prepared employing the reaction products of maleic anhydride and various dienes to effect cross-linking of the saponified copolymers of Example 1. The following table compiles these data showing tensile strength by the Instron method, elongation and softening temperature. The basic oil copolymer composition is the same as that produced in Example 1. The dianhydride type reaction product produced by reaction of maleic anhydride is tabulated by reference to the particular diene employed.

TABLE.—Characteristics of Cross-Linked Elastomers

| Diolefin | Conc. of Maleic Anhydride-Olefin Reaction Product | Softening Temp., °F. | Tensile Strength (Instron), p.s.i. | Elongation, Percent |
|---|---|---|---|---|
| 1, 5-hexadiene | 0 | 160 | 380 | 960 |
|  | 1 | 180 | 430 | 980 |
|  | 2 | 160 | 320 | 770 |
| 1, 7-octadiene | 0 | 170 | 240 | 660 |
|  | 1 | 295 | 400 | 680 |
| 2, 6, dimethyl-1, 7-octadiene | 0 | 170 | 240 | 660 |
|  | 1 | 200 | 350 | 1,000 |
|  | 2 | 400+ | 420 | 900 |
| Octadecadiene (From Example 3) | 0 | 170 | 240 | 660 |
|  | 1 | 360 | 464 | 780 |
|  | 2 | 250 | 415 | 733 |
|  | 3 | 340 | 390 | 727 |

These data show the remarkable improvement in softening point and tensile strength that results from the cross-linking of the polymer with the dianhydride-type reaction products. It may also be seen that the attempt to employ the hexadiene material was unsuccessful, since the softening temperature of the material was not increased by the addition and that addition of 2% of this product resulted in a decrease of tensile strength. The other materials showed a large gain in strength upon their addition. The hexadiene product also showed a significant degree of oil exudation which is not shown by the other materials.

Attempts were made to produce effective compositions employing a commercially available conventional dianhydride. The only readily available material, pyromellitic anhydride, could not be successfully dispersed in the oil-polymer mixtures.

As previously noted, foams were prepared from the cross-linked compositions, yielding tough light-weight materials which have many industrial uses.

While the compositions of this invention have been described in detail and several examples set forth of various embodiments of the invention, the examples are but illustrative, and the scope of the invention is limited only by the appended claims.

Other materials useful in the formulation of coatings may also be included in the compositions of the invention. Such material include polyethylene, polypropylene, etc., of either high density isotactic or atactic structure. Also, it is desirable to include agents such as oxidation inhibitors, corrosion inhibitors, etc.

I claim:

1. A coating composition consisting essentially of a hydrocarbon oil of lubricating viscosity having an aromatic ring content of from 15 to 75% by weight and from 20 to 80% by weight of a cross linked polymer formed by reacting in situ from 1 to 3 percent by weight of (x) a dianhydride produced by the reaction at a temperature from about 100° to 250° C. of about 2 moles of maleic anhydride with one mole of an aliphatic diene of 7 to 20 carbon atoms in which the two ethylene groups are separated by a chain of at least three carbon atoms in length, with from 97 to 99% by weight of (y) a polymer consisting essentially of randomly distributed monomer units characterized by the formulae:

(A) 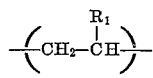

(B) 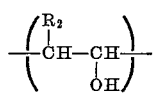

(C) 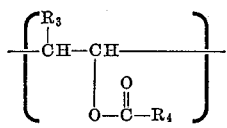

wherein $R_1$, $R_2$ and $R_3$ are hydrogen or alkyl radicals of 1 to 2 carbon atoms, $R_4$ is hydrogen or an alkyl radical of 1 to 11 carbon atoms, (A) is present in the polymer in the amount of 80 to 95 mole percent, (B) in the amount of 0.1 to 5 mole percent and (C) in the amount of 5 to 20 mole percent.

2. The composition of claim 1 wherein the hydrocarbon oil has an aromatic ring content of from 20 to 45% by weight.

3. The composition of claim 2 wherein $R_1$, $R_2$ and $R_3$ are hydrogen and $R_4$ is methyl.

4. The composition of claim 1 wherein the polymer is produced by the hydrolysis of a copolymer of an olefin of two to four atoms and an ester of an unsaturated alcohol of two to four carbon atoms.

5. The composition of claim 1 wherein the olefin is ethylene and the ester is vinyl acetate.

6. The composition of claim 4 wherein the hydrolysis is effected by saponification with a strong base.

7. The composition of claim 5 wherein the base is sodium hydroxide.

References Cited
UNITED STATES PATENTS

| | | | |
|---|---|---|---|
| 2,403,464 | 7/1946 | Smith | 8—115.5 |
| 2,490,550 | 12/1949 | Sermattei | 260—28.5 |
| 3,010,899 | 11/1961 | Boyer | 252—29 |

MORRIS LIEBMAN, *Primary Examiner.*

A. HOLTZ, J. FROME, *Assistant Examiners.*